J. E. Ford,
Hose Coupling.
No. 52,839.  Patented Feb. 27, 1866.
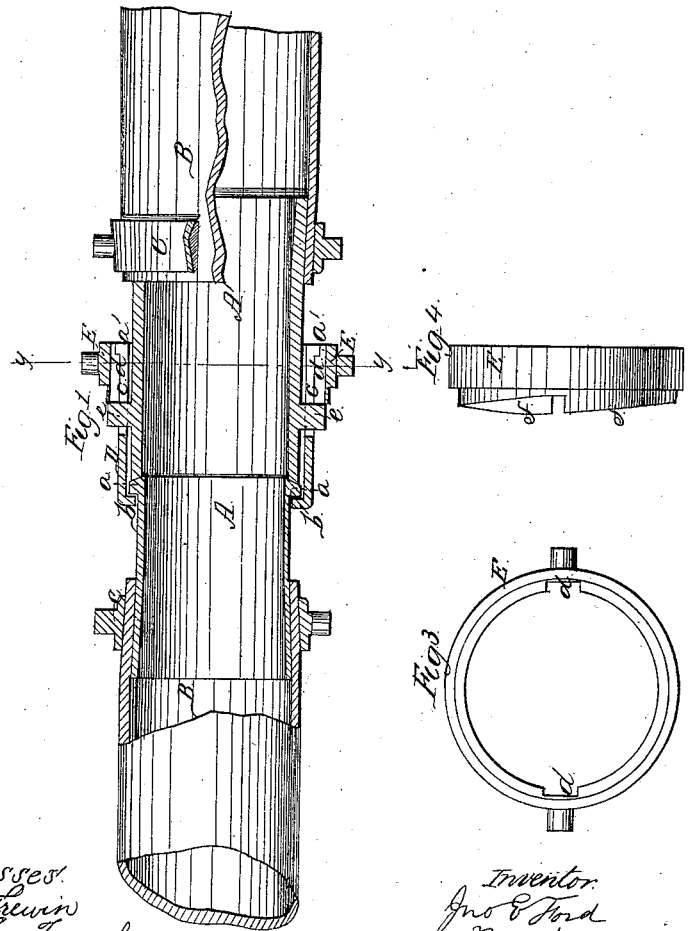

UNITED STATES PATENT OFFICE.

JOHN E. FORD, OF MEMPHIS, TENNESSEE.

IMPROVED HOSE-COUPLING.

Specification forming part of Letters Patent No. 52,839, dated February 27, 1866.

*To all whom it may concern:*

Be it known that I, JOHN E. FORD, of Memphis, in the county of Shelby and State of Tennessee, have invented a new and Improved Hose-Coupling; and I do hereby declare that the following is a full, clear, and exact description thereof, which will enable those skilled in the art to make and use the same, reference being had to the accompanying drawings, forming part of this specification, in which—

Figure 1 is a longitudinal section of my invention, taken in the line $x\,x$, Fig. 2; Fig. 2, a transverse vertical section of the same, taken in the line $y\,y$, Fig. 1; Fig. 3, a detached side view of a ring pertaining to the same; Fig. 4, an edge view of the same.

Similar letters of reference indicate corresponding parts.

This invention consists in the employment or use of a sleeve attached to one butt of the coupling and a ring fitted on said sleeve, the ring being slotted to receive projections on the other butt of the coupling and the ring provided with beveled or oblique surfaces, all arranged as hereinafter set forth, whereby the lengths of hose may be connected and disconnected with the greatest facility and very expeditiously.

A A' represent the two butts of the coupling, which are of slightly taper or cone form, their inner ends being the greatest in diameter.

B B represent the ends of two lengths of hose, which are secured on A A' by means of bands C C placed on the ends of the hose and driven up toward the inner and enlarged ends of the butts A A', as shown clearly in Fig. 1.

D represents a sleeve, which is fitted on the butt A, and is secured thereto by a lip or flange, $a$, at the outer end of A and a similar lip or flange, $b$, at the inner end of the sleeve, the latter being allowed to turn freely on the butt. This sleeve D has two slots, $c\,c$, made longitudinally in it at opposite points and extending from its outer edge inward a suitable distance.

E represents a ring, which is fitted loosely on the sleeve D and prevented from slipping off from its outer end by means of a lip or flange, $a'$, at the outer end of D. This ring has two grooves, $d\,d$, made in its inner surface at opposite points, to admit of projections $e\,e$ on the butt A' being passed through the ring and into the slots $c\,c$ of the sleeve D behind the ring. The rear edge of the ring E is provided with two beveled or oblique projections $f f$, (shown clearly in Fig. 4,) and when the projections $e\,e$ of the butt A' are passed through the grooves $d\,d$ of the ring and into the slots $c\,c$ at the rear of the ring, by turning the latter the beveled or oblique projections $f f$ will bear against the projections $e\,e$ of the butt A' and draw the two butts closely together in contact.

In order to detach or disconnect the butts, the ring E is turned in the reverse direction until the grooves $d\,d$ of the ring are in line with the slots $c\,c$ of the sleeve, when the projections are allowed to pass out through the ring.

By this simple arrangement lengths of hose may be readily connected and disconnected, and at the same time a very secure and tight coupling obtained.

Having thus described my invention, I claim as new and desire to secure by Letters Patent—

The sleeve D, provided with longitudinal slots $c\,c$ and fitted on the butt A, as shown, in combination with the projections $e\,e$ of the butt A', the ring E, having grooves $d\,d$ in its surface, provided with beveled or oblique projections $f f$ at its rear side, and fitted on the sleeve D, substantially as and for the purpose herein set forth.

JOHN E. FORD.

Witnesses:
J. W. VAN VLIET,
W. S. HAYNES.